United States Patent [19]

Neugen et al.

[11] Patent Number: 4,609,003
[45] Date of Patent: Sep. 2, 1986

[54] METHOD AND APPARATUS FOR GENERATION OF A PNEUMATIC FEEDBACK TRIGGER SIGNAL

[75] Inventors: Dink Neugen, Houston, Tex.; Stephen M. Bull, Westminster; Gabriel D. Ferramola, Arcadia, both of Calif.

[73] Assignee: Zwick Energy Research Organization, Inc., Huntington Beach, Calif.

[21] Appl. No.: 688,687

[22] Filed: Jan. 3, 1985

[51] Int. Cl.$^4$ ............................................. F17D 1/02
[52] U.S. Cl. ................................. 137/2; 62/514 JT; 137/455
[58] Field of Search ................. 137/455, 2; 62/514 JT

[56] References Cited

U.S. PATENT DOCUMENTS

| | | | |
|---|---|---|---|
| 3,528,219 | 9/1970 | De Marco et al. | 137/2 |
| 3,529,529 | 9/1970 | Schumacher | 137/2 |
| 3,933,003 | 1/1976 | Markum | 62/514 JT |
| 3,983,714 | 10/1976 | Fletcher et al. | 62/514 JT |
| 4,007,754 | 2/1977 | Beck et al. | 137/2 |
| 4,023,096 | 5/1977 | Schmidt | 137/2 |
| 4,080,802 | 3/1978 | Annable | 62/514 JT |
| 4,270,558 | 6/1981 | Forster et al. | 137/2 |

Primary Examiner—Ronald C. Capossela
Attorney, Agent, or Firm—Beehler, Pavitt, Siegemund, Jagger & Martella

[57] ABSTRACT

An entirely pneumatic feedback signal can be generated within a gas delivery system by diverting the portion of the gas from the main supply line to a cryostat. The gas is cooled in the cryostat and flows within a restricted passageway defined by the cryostat itself. The output of the cryostat is then coupled to the control port of a actuatable pneumatic valve. The actuatable pneumatic valve is coupled in series in the supply line and is normally biased closed. However, upon application of a predetermined magnitude of pressure to the control port of the actuatable valve, the valve is maintained in a open configuration. The output of the cryostat is provided to the control port of the valve. A fixed orifice is pneumatically communicated to the output of the cryostat and vents the cryostat's output into the environment. As long as the gas continues to flow freely through the cryostat the valve remains open. However, when contaminants within the gas are cooled with the cryostat below their freezing point, the contaminants will at least partially block the restricted passageway within the cryostat thereby reducing the amount of flow through the output of the cryostat. The fixed orifice will thereby bleed off the backpressure created by the orifice which is communicated to the control port of the valve in response the valve will shut. Thus, contaminants within the gas beyond a predetermined concentration will cause the gas delivery system to shut off through an entirely pneumatic feedback loop.

5 Claims, 2 Drawing Figures

METHOD AND APPARATUS FOR GENERATION OF A PNEUMATIC FEEDBACK TRIGGER SIGNAL

BACKGROUND OF THE INVENTION

I. Field of the Invention

The invention relates to the field of gas delivery systems and in particular to a method and apparatus for generating a pneumatic feedback signal to actuate a response upon the occurrence of an event.

II. Description of the Prior Art

Pressurized nitrogen is utilized in a large number of presently practiced industrial service and operational methodologies. In the field of aeronautics, for example, some of these applications include not only charging the aircraft tires and struts, but also charging or servicing a number of pneumatic control systems used throughout an aircraft. In the case of military aircraft, the number of such pneumatic control systems is substantially multiplied since the mission or functions which such aircraft serve are more complex and varied than those encountered in civil aircraft. Thus, in the case of military aircraft not only must the aircraft systems themselves be serviced or recharged with nitrogen, but often the aircraft carries one or more sophisticated weapons systems, which systems in turn also include a number of pneumatic actuators and controls which require charging.

Many of these systems require the injection of highly purified nitrogen or other gas in order to operate or reliably function in a wide extreme of environmental conditions. Therefore, various prior art devices have been developed wherein the gas is passed through a number of filters to remove particulate matter, and to reduce the level of contaminants, such as hydrocarbons and water, to an acceptable level. However, since the aircraft are serviced in the field, often under adverse environmental conditions, some means must be included to test the operation of the filtration system and to shut the system down or take other appropriate action in the event that contaminants begin to leak through the system. In any case, most filtration systems are cumulative and will eventually be saturated with contaminants. It is thus very important not to continue use of the system when the filters have become saturated, otherwise certain control systems or weapon systems within the aircraft might become charged with contaminated gas and fail to function.

Therefore, in order to build in such safeguards, the art has devised various systems wherein the contaminant flowing through the filtration system is sensed, and in the event that it exceeds a predetermined limit, the system is shut down. Such prior art systems, in the case of nitrogen delivery apparatus, have included electrical systems utilizing a nitrogen sensor which will, through appropriate control circuitry, actuate a solenoid powered electromechanical valve. Since the nitrogen charging system is usually mobile to deliver the nitrogen to the aircraft, such prior art systems are necessarily battery powered.

While such electrical control systems operate effectively, they are often complex, subject to failure when subjected to prolonged environmental exposure, and furthermore require that the battery pack be maintained in a charged condition. If in any event the battery should lose sufficient charge, the electrical control feedback system may malfunction with the result that contaminated nitrogen would be injected into the aircraft system without the operator's knowledge, or that at least the nitrogen servicing unit would be rendered inoperative until the battery could be recharged or replaced. This then results in a longer turn around or downtime for the aircraft which could otherwise be airborne.

What is needed then is a reliable and rugged method and apparatus whereby gas delivery apparatus may be monitored and controlled for contaminants without the shortcomings of the prior art as discussed above.

BRIEF SUMMARY OF THE INVENTION

The invention includes a method for generating a pneumatic feedback trigger signal in a gas delivery system. The steps comprise sampling a portion of gas from the gas delivery system, providing a backpressure, determining the amount of a contaminant within the sampled gas, reducing the backpressure when the amount of the contaminants exceeds a predetermined magnitude, and pneumatically actuating a valve in response to the reduction in backpressure. The valve is included within the gas delivery system, and actuation of the valve effectuates an appropriate response to the existence of the contaminant in the gas. By this combination of steps an entirely pneumatic system is provided for responding to the existence of the contaminant in the gas.

More particularly the step of reducing the backpressure comprises the steps of reducing the pressure of the sampled gas supplied to an orifice, coupling the reduced pressure of the sampled gas to the valve, and leaking the reduced pressure of the sampled gas through the orifice thereby reducing the gas pressure coupled to the valve below a predetermined threshold. The step of actuating the valve occurs when the backpressure is reduced below a predetermined threshhold magnitude.

Alternatively, the step of determining the amount of the contaminant in the gas comprises the step of providing the gas to a cryostat, cooling the gas within the cryostat to a temperature below the freezing point of the contaminants. The step of reducing the backpressure comprises the steps of providing the gas to the valve, at least partially blocking the flow of the gas through the cryostat, and continuing to bleed the gas through the orifice whereby the backpressure is reduced. The step of pneumatically actuating the valve comprises the step of delivering the reduced back pressure to the valve.

The invention can also be characterised as a method of generating a pneumatic feedback signal in a gas delivery system comprising the steps of sampling a gas from the gas delivery system in a cryostat, where the cryostat has an output gas pressure, delivering the output gas pressure of the cryostat to an orifice and pneumatically actuatable valve, bleeding a predetermined amount of gas through the orifice to create a backpressure at the orifice, coupling the backpressure to the valve, and actuating the valve when the backpressure assumes a magnitude within a predetermined range.

The invention still further includes a method for pneumatically providing a pneumatic feedback threshold signal indicative of contaminants within a gas in a gas delivery system. The method comprises the steps of diverting a portion of gas from a supply line, cooling the diverted gas to a temperature below the freezing point of the contaminants, flowing the cooled gas through a restricted passageway, {the passageway being characterized by susceptibility to blockage by frozen constituents within the gas}, communicating the cooled gas from the restricted passageway to an actuatable valve, leaking a portion of the cooled gas communicated to the actuatable valve to the environment, and selectively blocking the restricted passageway with frozen contaminants when the contaminants exceed a predetermined concentration within the gas.

The invention can also be characterized as an apparatus for generating a pneumatic feedback signal in a gas delivery system comprising a supply line for conveying gas, a cryostat coupled to the supply line to divert at least a portion of gas within the supply line to the cryostat. An orifice is coupled to the output of the cryostat. The orifice defines a fixed gas flow restriction. A pneumatically actuatable valve is coupled to the output of the cryostat and to the orifice. The valve is serially disposed in the supply line and is thereby arranged and configured to interdict flow of gas through the supply line. The orifice is sized to create a predetermined backpressure. The backpressure is communicated to the valve. The cryostat is characterized by an output pressure indicative of a substantially free flow of gas through the cryostat and a second output pressure which results from a partially or completely blocked gas flow through the cryostat. The valve is actuated when the backpressure applied thereto falls below a predetermined magnitude.

The invention can also include an apparatus for providing a pneumatic feedback threshhold signal within a gas delivery system comprising a first mechanism for controllably delivering a gas, and a second mechanism for detecting contaminants within the gas. The second mechanism pneumatically communicates with the first mechanism. A third mechanism provides a controlled leakage rate. The second mechanism is pneumatically coupled to the third mechanism. The second mechanism provides gas at a pressure to the third mechanism at a pressure magnitude indicative of the concentration of contaminants within the gas. The third mechanism pneumatically communicates with the first mechanism. The first mechanism is responsive to the third mechanism to control delivery of the gas in response to a backpressure created by restricted leakage provided by the third mechanism.

The invention and its various embodiments may be better understood by now turning to the following detailed description of an illustrated embodiment.

DETAILED DESCRIPTION OF THE PREFERRED EMBODIMENTS

The invention is a method and apparatus for pneumatically sensing a predetermined level of contaminants in a gas delivery system and for generating a pneumatic feedback trigger signal to control or shut down the gas delivery system upon the contingency that the level of contaminants within the gas delivery system exceeds the predetermined level. More particularly, the invention comprises a method and apparatus wherein the gas delivered through the gas delivery system is sampled through a cryostat. The output of the cryostat is then coupled to an orifice of a predetermined size or diameter. The output of the cryostat is also coupled to a pneumatically actuated valve. The pneumatically actuated valve is connected serially within the main output line, such that all gas delivered from the system is delivered through the pneumatically actuated valve. The predetermined size of the orifice is chosen such that the leakage through the orifice creates a backpressure at the output of the cryostat sufficient to maintain the pneumatically actuated valve in an open state. However, as soon as the cryostat senses the predetermined level of contaminants, the pressure or output from the cryostat will decrease. The balance between the output of the cryostat and the orifice will then change with the backpressure falling to a new equilibrium or value. However, the reduction of backpressure is sufficient to actuate the serially connected, pneumatically actuated valve thereby shutting off the gas delivery system.

Figure 1:
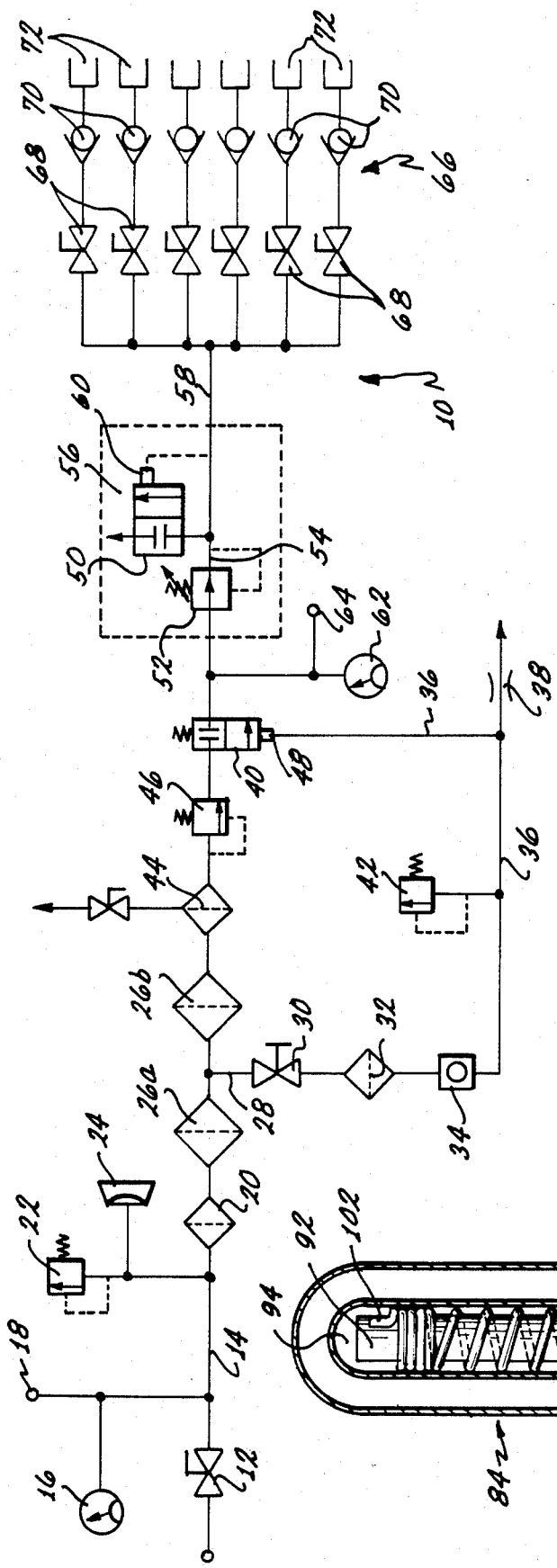
FIG. 1 is a diagrammatic depiction of a portion of a pneumatic system for delivering nitrogen which incorporates the invention.

Turn now to FIG. 1 wherein a diagrammatic depiction of a portion of a gas delivery system is shown which incorporates the invention. A gas delivery system drawing from a tank of liquid nitrogen (not shown) vaporizes the nitrogen and delivers a flow of nitrogen under pressure to nitrogen purifier system, generally denoted by reference numeral 10. The nitrogen flow is delivered to an input valve 12. The output of valve 12 is coupled to a main supply line 14. Supply line 14 is also provided with a pressure gauge 16 and a test point fixture 18. Main supply line 14 is coupled to a multistage filter the first of which stages is shown as a conventional ten micron filter and dessicator 20. Upstream from filter 20, a conventional burst disk 24 is provided as a failsafe backup and is designed to fail at a pressure slightly above the trip point of relief valve 22 described below, namely 3700 psi.

The output of ten micron filter 20 is coupled to a conventional second stage filter and dessicator 26a. In the illustrated embodiment the filters are designed to remove all particulate contaminants, oils, or other petroleum based substances and further includes a dessicating agent to remove any water vapor contained within the nitrogen gas.

A sample line 28 is coupled between filters 26a, and 26b. Sample line 28 is coupled through a valve 30 to a two micron filter 32. The output of two micron filter 32 is then coupled to a cryostat 34 which will be described in greater detail in connection with FIG. 2. The output of cryostat 34 is in turn coupled by means of feedback line 36 to an orifice 38 of predetermined size or diameter and to a pneumatically actuated valve 40. A relief valve 42 is also coupled to feedback line 36 to release any overpressures from the output of cryostat 34, namely pressures in excess of 80 psi.

Returning again to the primary gas flow path, the output of filter 26a, 26b is similarly coupled to a two micron filter 44. The output of two micron filter 44 is coupled to a backpressure valve 46. Pressure valve 46 is normally closed unless a predetermined amount of pressure, namely at least 3000 psi, is applied to its input at which point it opens and remains open as long as the minimum pressure is maintained at its input. Thus, nitrogen purification system 10 will not produce an output unless at least a minimum pressure is available.

The output of backpressure valve 46 is coupled to the input of pneumatically actuated valve 40. Valve 40 is normally closed unless a predetermined amount of pressure, namely 60 psi, is provided at its control port 48.

The output of pneumatically actuated valve 40 is then coupled to a pressure regulator 50. Pressure regulator 50 is conventional and regulates the output pressure to an operator selected point within the range of 500–3600 psi. A relief valve 62 is coupled to output 58 and will open at 3650 psi. Coupled to output 58 of pressure regulating valve 50 is a gauge 62 and a second test point fixture 64 to allow operator monitoring.

Output line 58 in turn is coupled to a distribution network, generally denoted by reference numeral 66. Network 66 includes a plurality of manually actuated valves 68 coupled in parallel with each other to output line 58. Each valve 68 in turn has its output serially coupled to a one-way check valve 70 which permits outflow only. Check valve 70 in each case is then serially coupled to a fixture 72 adapted to fit into the aircraft or weapons system in question.

Figure 2:
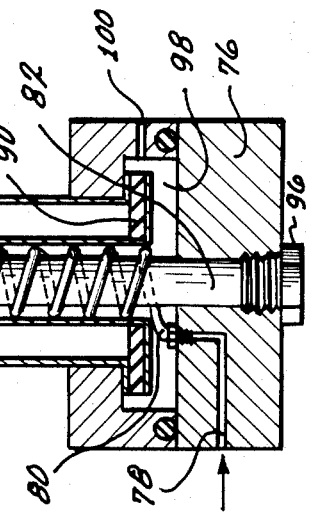
FIG. 2 is a simplified cross-sectional view in enlarged scale of a cryostat incorporated in the pneumatic system of FIG. 1.

Turn now to FIG. 2 wherein cryostat 34 is shown in greater detail in enlarged scale. Cryostat 34 includes manifold block 76 in which an inlet duct 78 is defined. Inlet duct 78 is coupled to the output of two micron filter 32 shown in FIG. 1. Nitrogen gas communicated through duct 78 to a capillary tube 80. Capillary tube 80 is spirally wound about a hollow rod 82. Rod 82 is axially disposed in and extends within a cylindrical double-walled dewar, generally denoted by reference numeral 84. In particular, dewar 84 includes an outer glass envelope 86 and an inner glass envelope 88. The space defined between envelopes 86 and 88 is then evacuated to provide effective thermal insulation from the ambient environment. The inner surface of the inner envelope 88 of dewar 84 is slip fit or closely fitted to the outer diameter of the wrappings of capillary tube 80 about rod 82. Capillary tube 80 extends axially within inner dewar 88 to the distal end 92 of rod 82 wherein capillary tube 80 is tightly wound about rod 82. Capillary tube 80 terminates at end 92 and vents into space 94 defined between end 92 of rod 82 and within inner dewar 88. Hollow rod 82 is sealed at its opposing end by means of plug 96. Therefore nitrogen gas, forced under pressure through capillary tube 80, exits from its distal end near end 92 of rod 82 and is then forced to flow axially back along the outside of capillary tube 80 and rod 82 toward chamber 98 defined within manifold block 76. The rapid expansion of nitrogen gas from the distal end of capillary tube 80 causes a rapid cooling in the gas and ultimately cooling a substantial portion of the windings of tube 80 on rod 82 within dewar 84. The cooled nitrogen gas ultimately enters chamber 98 and flows through outlet port 100. Outlet port 100 is then coupled to feedback line 36 shown in FIG. 1. Therefore, output port 100 of cryostat 34 is pneumatically coupled to an orifice of a predetermined size and to control port 48 of pneumatically actuated valve 40. Depending upon the size of orifice 38 a certain backpressure will be established on feedback line 36 coupled to outlet port 100. This feedback pressure can be selected so that valve 40 is maintained in an open configuration to allow nitrogen gas to be delivered to network 66. The output flow at port 100 of cryostat 34 can be adjusted by shortening tube 80, i.e. the shorter the tube, the higher the output flow at port 100.

However, the cooled expanded nitrogen gas exiting from end 102 of capillary tube 80 is actually cool enough to liquify the nitrogen and to freeze any water vapor which may still be entrained within the nitrogen gas and not removed by filter 26a. Should water vapor be present in the nitrogen gas to a sufficient extent, the water will ultimately freeze and clog capillary tube 80. In any case if water vapor is present, the flow and pressure at outlet port 100 will be decreased or completely blocked. A sufficient change in output pressure at outport 100 and thus at feedback line 36 will cause a new backpressure equilibrium to be achieved. In the case of complete blockage within cryostat 34, the equilibrium pressure will ultimately assume the value of the ambient pressure since any accumulated backpressure will bleed off through orifice 38. A decrease in the backpressure on line 36 will remove the pressure from control port 48 at valve 40 therefore allowing valve 40 to return to its normally closed configuration. When valve 40 closes, nitrogen purifier system 10 is shut down.

Thus it can be readily appreciated that the pressure values chosen in any particular application can be varied according to the teachings of the present invention to assume any one of the number of possible magnitudes. The response time of the system can also be varied depending upon the size of orifice 38 which will largely determine the time required for system shut down to occur after blockage has occurred in cryostat 34.

The structure and general principle of operation of nitrogen purifier system 10 now having been described, a specific example can be given. For example, nitrogen gas is supplied at 3600 psi from a nitrogen supply system (not shown) to valve 12. This pressure will appear at gauge 16. The supplied nitrogen is then fed to filters 20, 26a, 26b and 44. Valve 46 will open with a minimum of 3000 psi supplied to its inlet. As the pressure builds at the inlet of valve 46 it is also diverted through filter 26a into filter 32 to cryostat 34. Nitrogen flows through cryostat 34 to feedback line 36. Orifice 38 is sized such that a backpressure of at least 60 psi is established. At 60 psi at control port 48 of valve 40, valve 40 will open and allow nitrogen to flow to pressure regulator 50. The pressure at output 58 of regulator is set by the operator and is shown on gauge 62. Pressure regulator 50 then delivers nitrogen gas to network 66 at the set pressure plus or minus 5%. In the illustrated embodiment the sizing of orifice 38 is 0.009 inch in diameter although the appropriate size can be empirically determined in each case and will depend not only upon the output of cryostat 34 and the specification of valve 40 but upon the size and length of feedback line 36 coupling these elements as well as cumulative individual variations among the elements in the system as a whole. Again in the illustrated embodiment, cryostat 34 reaches thermal equilibrium within 120 seconds and a temperature at least as low as −320 degrees Fahrenheit. It has been empirically determined that if at least 3 parts per million of water vapor are present within the nitrogen gas, cryostat 34 will freeze and clog thereby dropping gauge pressure at output 100 to zero. Within 20 seconds orifice 38 will drop the backpressure level below at least 25 psi and valve 40 is then actuated at least within 10 seconds thereafter. Normally cryostat 34 once clogged and frozen will remain frozen, thereby allowing ample opportunity for the operator to note the cessation of operation and to take corrective action, such as checking each of the filters and replacing them as appropriate or locating the source of contamination in the nitrogen supply. Plug 96 may be removed from cryostat 34 and warm air blown through hollow rod 82 to thaw cryostat 34 when operation is to be renewed. Normally, removal of cryostat 34 from system 10 and a gentle warming is sufficient to thaw and unblock cryostat 34 for a renewed operation. For example, in the field it is sufficient to remove cryostat 34 and either simply hand hold dewar 84 for a few minutes or to generally warm the dewar with body heat by pocketing the dewar for a similar period of time.

Many modifications and alterations may be made by those having ordinary skill in the art without departing from the spirit and scope of the invention. The illustrated embodiment has been shown only by way of example and should not be taken as limiting the invention which is defined in the following claims.

We claim:

1. A method for generating a pneumatic feedback trigger signal in a gas deliver system comprising the steps of:
   sampling a portion of gas from said gas delivery system;
   determining the amount of a contaminant within said sampled gas;
   reducing a backpressure in the event that the amount of said contaminants exceeds a predetermined magnitude; and
   pneumatically actuating a valve in response to said backpressure, said valve included within said gas delivery system, actuation of the said valve effectuating an appropriate response to the existence of said contaminant in said gas,
   whereby an entirely pneumatic system is provided for responding to the existence of said contaminant in said gas.

2. The method of claim 1 where said step of reducing said backpressure comprises the steps of:
   reducing the pressure of said sampled gas supplied to an orifice;
   communicating said reduced pressure of said sampled gas to said valve; and
   venting said reduced pressure of said sampled gas provided to said orifice to ambient thereby reducing said gas pressure communicated to said valve below a predetermined threshold magnitude, said step of actuating said valve occurring when said gas pressure communicated to said valve is reduced below said predetermined threshold magnitude.

3. An apparatus for providing a pneumatic feedback threshhold signal within a gas delivery system comprising:
   first means for controllably delivering a gas;
   second means for detecting contaminants within said gas, said second means pneumatically communicating with said first means; and
   third means for providing a controlled leakage rate, said second means pneumatically coupled to said third means, said second means providing gas at a pressure to said third means at a pressure magnitude indicative of the concentration of contaminants within said gas, said third means pneumatically communicating with said first means, first means responsive to said third means to control delivery of said gas in response to a backpressure created by restricted leakage provided by said third means,
   whereby said apparatus provided with an entirely pneumatic feedback control in response to contaminant detection with in said gas.

4. The apparatus of claim 3 wherein said first means comprises a supply line and a pneumatically controllable valve serially connected within said supply line.

5. The apparatus of claim 3 wherein said third means comprises a fixed orifice having an output vented to the environment.

* * * * *